US009542750B2

(12) United States Patent
Muninder et al.

(10) Patent No.: US 9,542,750 B2
(45) Date of Patent: Jan. 10, 2017

(54) METHOD, APPARATUS AND COMPUTER PROGRAM PRODUCT FOR DEPTH ESTIMATION OF STEREO IMAGES

(71) Applicant: Nokia Technologies Oy, Espoo (FI)

(72) Inventors: Veldandi Muninder, San Jose, CA (US); Soumik Ukil, Bangalore (IN); Krishna Annasagar Govindarao, Bangalore (IN)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/561,002

(22) Filed: Dec. 4, 2014

(65) Prior Publication Data

US 2015/0170371 A1   Jun. 18, 2015

(51) Int. Cl.
  *G06K 9/00* (2006.01)
  *G06T 7/00* (2006.01)
  *H04N 13/00* (2006.01)

(52) U.S. Cl.
  CPC ......... *G06T 7/0075* (2013.01); *H04N 13/0022* (2013.01); *G06T 2207/10012* (2013.01); *G06T 2207/10024* (2013.01); *H04N 2013/0081* (2013.01)

(58) Field of Classification Search
  CPC .... G06T 7/0075; G06T 7/0097; G06T 7/0081; G06T 7/408; G06T 2207/10012; H04N 13/0022
  USPC ........................................................ 382/154
  See application file for complete search history.

(56) References Cited

U.S. PATENT DOCUMENTS

| 8,009,897 B2 | 8/2011 | Xu et al. |
| 8,406,512 B2 | 3/2013 | Lin et al. |
| 8,428,342 B2 | 4/2013 | Tian et al. |

(Continued)

FOREIGN PATENT DOCUMENTS

| CN | 101877128 A | 11/2010 |
| CN | 102223553 A | 10/2011 |

OTHER PUBLICATIONS

Hong et al., "Segment Based Stereo Matching Using Graph Cuts", IEEE Computer Society Conference on Computer Vision and Pattern Recognition, vol. 1, Jun. 27-Jul. 2, 2004, 8 Pages.

(Continued)

*Primary Examiner* — Ruiping Li
(74) *Attorney, Agent, or Firm* — Alston & Bird LLP

(57) ABSTRACT

In an example embodiment, a method, apparatus and computer program product are provided. The method includes facilitating receipt of primary depth map and plurality of color segments, the primary depth map associated with a first image and a second image that are stereoscopic pair of images of a scene, and the color segments associated with the first image. The method includes generating plurality of disparity planes based on the color segments and the primary depth map. The method includes determining aggregated cost volume between pixels of the first and second images for the disparity planes. The method includes assigning plane labels corresponding to the disparity planes to pixels of the first and second images based on the aggregated cost volume, an individual pixel being assigned a plane label. The method includes generating secondary depth map based on the plane labels assigned to the pixels of the first and second images.

21 Claims, 6 Drawing Sheets

(56) References Cited

U.S. PATENT DOCUMENTS

| | | | |
|---|---|---|---|
| 8,619,082 B1* | 12/2013 | Ciurea | H04N 13/0022 345/427 |
| 2012/0155743 A1 | 6/2012 | Kim | |
| 2013/0132407 A1 | 5/2013 | Krishnmurthy et al. | |
| 2013/0155050 A1* | 6/2013 | Rastogi | G06T 5/50 345/419 |
| 2013/0259360 A1 | 10/2013 | Bingrong et al. | |

OTHER PUBLICATIONS

Klaus et al., "Segment-Based Stereo Matching Using Belief Propagation and a Self-Adapting Dissimilarity Measure", 18th International Conference on Pattern Recognition, vol. 3, 2006, 5 Pages.

Xing et al., "Segment-Tree Based Cost Aggregation for Stereo Matching", IEEE Conference on Computer Vision and Pattern Recognition, Jun. 23-28, 2013, pp. 313-320.

Yang, "A Non-Local Cost Aggregation Method for Stereo Matching", IEEE Conference on Computer Vision and Pattern Recognition, Jun. 16-21, 2012, 8 Pages.

Bleyer et al., "Patch Match Stereo—Stereo Matching with Slanted Support Windows", Proceedings of the British Machine Vision Conference, Sep. 2011, pp. 1-11.

Xu et al., "Hybrid Plane Fitting for Depth Estimation", Asia-Pacific Signal & Information Processing Association Annual Summit and Conference, Dec. 3-6, 2012, 4 pages.

"Yang et al., "Near Real-Time Stereo for Weakly-Textured Scenes", Proceedings of the British Machine Vision Conference, Sep. 2008, 10 pages."

Extended European Search Report received for corresponding European Patent Application No. 14194013.0, dated May 22, 2015, 7 pages.

Bleyer et al., "Graph-Cut-Based Stereo Matching Using Image Segmentation With Symmetrical Treatment of Occlusions", Signal Processing: Image Communication, vol. 22, No. 2, Feb. 2007, pp. 127-143.

Bleyer et al., "A Layered Stereo Matching Algorithm Using Image Segmentation and Global Visibility Constraints", ISPRS Journal of Photogrammetry and Remote Sensing, vol. 59, No. 3, May 2005, pp. 128-150.

* cited by examiner

METHOD, APPARATUS AND COMPUTER PROGRAM PRODUCT FOR DEPTH ESTIMATION OF STEREO IMAGES

TECHNICAL FIELD

Various implementations relate generally to method, apparatus, and computer program product for depth estimation of stereo images.

BACKGROUND

Various electronic devices, for example, cameras, mobile phones, and other multimedia devices are widely used for capturing image of a scene. Some electronic devices are capable of capturing stereoscopic images, and performing depth estimation of the scene using the stereoscopic images. Depth estimation is a process that determines distance to multiple objects present in a camera view and is performed using a variety of methods. Stereo correspondence is one such method that performs the depth estimation by matching pixels in the stereoscopic images to obtain a depth map. Normally, the method of stereo correspondence includes different steps to obtain the depth map. Examples of the steps include color segmentation, cost aggregation, disparity plane estimation, and plane fitting of the segments to disparity planes of the scene. However, errors in the color segmentation, under-segmentation, and over-segmentation lead to an inaccurate depth map. Moreover, some pixels cannot be matched due to occlusion between the stereoscopic images, due to which incorrect matches are represented by holes in the depth map.

SUMMARY OF SOME EMBODIMENTS

Various aspects of examples embodiments are set out in the claims.

In a first aspect, there is provided a method comprising: facilitating receipt of a primary depth map and a plurality of color segments, the primary depth map being associated with a first image and a second image of a scene, the first image and the second image being a stereoscopic pair of images of the scene, and the plurality of color segments being associated with the first image; generating a plurality of disparity planes for the scene based on the plurality of color segments and the primary depth map, the plurality of disparity planes associated with a plurality of plane labels; determining an aggregated cost volume between pixels of the first image and pixels of the second image for the plurality of disparity planes; assigning plane labels to pixels of at least one image of the first image and the second image based on the aggregated cost volume, where an individual pixel of the pixels is assigned a plane label of the plane labels; and generating a secondary depth map based on the plane labels assigned to the pixels of the at least one image.

In a second aspect, there is provided an apparatus comprising at least one processor; and at least one memory comprising computer program code, the at least one memory and the computer program code configured to, with the at least one processor, cause the apparatus to perform at least: facilitate receipt of a primary depth map and a plurality of color segments, the primary depth map being associated with a first image and a second image of a scene, the first image and the second image being a stereoscopic pair of images of the scene, and the plurality of color segments being associated with the first image, the first image and the second image being a stereoscopic pair of images of the scene; generate a plurality of disparity planes for the scene based on the plurality of color segments and the primary depth map, the plurality of disparity planes associated with a plurality of plane labels; determine an aggregated cost volume between pixels of the first image and pixels of the second image for the plurality of disparity planes; assign plane labels to pixels of at least one image of the first image and the second image based on the aggregated cost volume, wherein an individual pixel of the pixels is assigned a plane label of the plane labels; and generate a secondary depth map based on the plane labels assigned to the pixels of the at least one image.

In a third aspect, there is provided a computer program product comprising at least one computer-readable storage medium, the computer-readable storage medium comprising a set of instructions, which, when executed by one or more processors, cause an apparatus to perform at least: facilitate receipt of a primary depth map and a plurality of color segments, the primary depth map being associated with a first image and a second image of a scene, the first image and the second image being a stereoscopic pair of images of the scene, and the plurality of color segments being associated with the first image; generate a plurality of disparity planes for the scene based on the plurality of color segments and the primary depth map, the plurality of disparity planes associated with a plurality of plane labels; determine an aggregated cost volume between pixels of the first image and pixels of the second image for the plurality of disparity planes; assign plane labels to pixels of at least one image of the first image and the second image based on the aggregated cost volume, wherein an individual pixel of the pixels is assigned a plane label of the plane labels; and generate a secondary depth map based on the plane labels assigned to the pixels of the at least one image.

In a fourth aspect, there is provided an apparatus comprising: means for facilitating receipt of a primary depth map and a plurality of color segments, the primary depth map being associated with a first image and a second image of a scene, the first image and the second image being a stereoscopic pair of images of the scene, and the plurality of color segments being associated with the first image; means for generating a plurality of disparity planes for the scene based on the plurality of color segments and the primary depth map, the plurality of disparity planes associated with a plurality of plane labels; means for determining an aggregated cost volume between pixels of the first image and pixels of the second image for the plurality of disparity planes; means for assigning plane labels to pixels of at least one image of the first image and the second image based on the aggregated cost volume, wherein an individual pixel of the pixels is assigned a plane label of the plane labels; and means for generating a secondary depth map based on the plane labels assigned to the pixels of the at least one image.

In a fifth aspect, there is provided a computer program comprising program instructions which when executed by an apparatus, cause the apparatus to: facilitate receipt of a primary depth map and a plurality of color segments, the primary depth map being associated with a first image and a second image of a scene, the first image and the second image being a stereoscopic pair of images of the scene, and the plurality of color segments being associated with the first image; generate a plurality of disparity planes for the scene based on the plurality of color segments and the primary depth map, the plurality of disparity planes associated with a plurality of plane labels; determine an aggregated cost volume between pixels of the first image and pixels of the second image for the plurality of disparity planes; assign plane labels to pixels of at least one image of the first image and the second image based on the aggregated cost volume, wherein an individual pixel of the pixels is assigned a plane label of the plane labels; and generate a secondary depth map based on the plane labels assigned to the pixels of the at least one image.

BRIEF DESCRIPTION OF THE FIGURES

Various embodiments are illustrated by way of example, and not by way of limitation, in the figures of the accompanying drawings in which.

DETAILED DESCRIPTION

Example embodiments and their potential effects are understood by referring to FIGS. 1 through 7 of the drawings.

Figure 1:
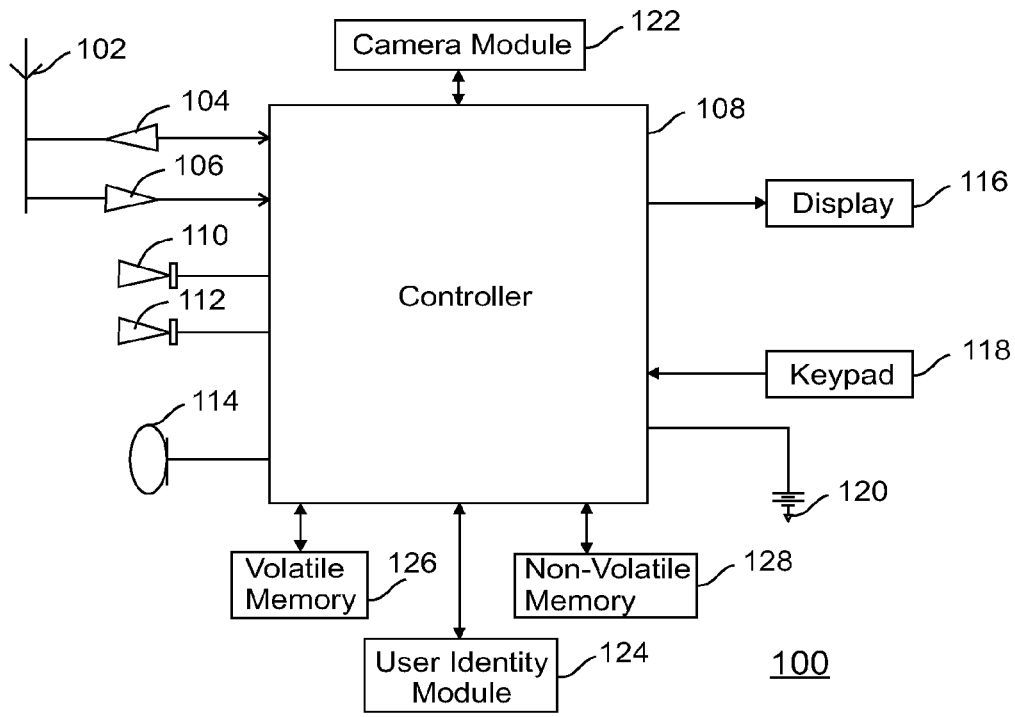
FIG. 1 illustrates a device, in accordance with an example embodiment.

FIG. 1 illustrates a device 100 in accordance with an example embodiment. It should be understood, however, that the device 100 as illustrated and hereinafter described is merely illustrative of one type of device that may benefit from various embodiments, therefore, should not be taken to limit the scope of the embodiments. As such, it should be appreciated that at least some of the components described below in connection with the device 100 may be optional and thus in an example embodiment may include more, less or different components than those described in connection with the example embodiment of FIG. 1. The device 100 could be any of a number of types of mobile electronic devices, for example, portable digital assistants (PDAs), pagers, mobile televisions, gaming devices, cellular phones, all types of computers (for example, laptops, mobile computers or desktops), cameras, audio/video players, radios, global positioning system (GPS) devices, media players, mobile digital assistants, or any combination of the aforementioned, and other types of communications devices.

The device 100 may include an antenna 102 (or multiple antennas) in operable communication with a transmitter 104 and a receiver 106. The device 100 may further include an apparatus, such as a controller 108 or other processing device that provides signals to and receives signals from the transmitter 104 and receiver 106, respectively. The signals may include signaling information in accordance with the air interface standard of the applicable cellular system, and/or may also include data corresponding to user speech, received data and/or user generated data. In this regard, the device 100 may be capable of operating with one or more air interface standards, communication protocols, modulation types, and access types. By way of illustration, the device 100 may be capable of operating in accordance with any of a number of first, second, third and/or fourth-generation communication protocols or the like. For example, the device 100 may be capable of operating in accordance with second-generation (2G) wireless communication protocols IS-136 (time division multiple access (TDMA)), GSM (global system for mobile communication), and IS-95 (code division multiple access (CDMA)), or with third-generation (3G) wireless communication protocols, such as Universal Mobile Telecommunications System (UMTS), CDMA1000, wideband CDMA (WCDMA) and time division-synchronous CDMA (TD-SCDMA), with 3.9G wireless communication protocol such as evolved-universal terrestrial radio access network (E-UTRAN), with fourth-generation (4G) wireless communication protocols, or the like. As an alternative (or additionally), the device 100 may be capable of operating in accordance with non-cellular communication mechanisms. For example, computer networks such as the Internet, local area network, wide area networks, and the like; short range wireless communication networks such as include Bluetooth® networks, Zigbee® networks, Institute of Electric and Electronic Engineers (IEEE) 802.11x networks, and the like; wireline telecommunication networks such as public switched telephone network (PSTN).

The controller 108 may include circuitry implementing, among others, audio and logic functions of the device 100. For example, the controller 108 may include, but are not limited to, one or more digital signal processor devices, one or more microprocessor devices, one or more processor(s) with accompanying digital signal processor(s), one or more processor(s) without accompanying digital signal processor(s), one or more special-purpose computer chips, one or more field-programmable gate arrays (FPGAs), one or more controllers, one or more application-specific integrated circuits (ASICs), one or more computer(s), various analog to digital converters, digital to analog converters, and/or other support circuits. Control and signal processing functions of the device 100 are allocated between these devices according to their respective capabilities. The controller 108 thus may also include the functionality to convolutionally encode and interleave message and data prior to modulation and transmission. The controller 108 may additionally include an internal voice coder, and may include an internal data modem. Further, the controller 108 may include functionality to operate one or more software programs, which may be stored in a memory. For example, the controller 108 may be capable of operating a connectivity program, such as a conventional Web browser. The connectivity program may then allow the device 100 to transmit and receive Web content, such as location-based content and/or other web page content, according to a Wireless Application Protocol (WAP), Hypertext Transfer Protocol (HTTP) and/or the like. In an example embodiment, the controller 108 may be embodied as a multi-core processor such as a dual or quad core processor. However, any number of processors may be included in the controller 108.

The device 100 may also comprise a user interface including an output device such as a ringer 110, an earphone or speaker 112, a microphone 114, a display 116, and a user input interface, which may be coupled to the controller 108. The user input interface, which allows the device 100 to receive data, may include any of a number of devices allowing the device 100 to receive data, such as a keypad 118, a touch display, a microphone or other input device. In embodiments including the keypad 118, the keypad 118 may include numeric (0-9) and related keys (#, *), and other hard and soft keys used for operating the device 100. Alternatively or additionally, the keypad 118 may include a conventional QWERTY keypad arrangement. The keypad 118 may also include various soft keys with associated functions. In addition, or alternatively, the device 100 may include an interface device such as a joystick or other user input interface. The device 100 further includes a battery 120, such as a vibrating battery pack, for powering various circuits that are used to operate the device 100, as well as optionally providing mechanical vibration as a detectable output.

In an example embodiment, the device 100 includes a media capturing element, such as a camera, video and/or audio module, in communication with the controller 108. The media capturing element may be any means for capturing an image, video and/or audio for storage, display or transmission. In an example embodiment in which the media capturing element is a camera module 122, the camera module 122 may include a digital camera capable of forming a digital image file from a captured image. As such, the camera module 122 includes all hardware, such as a lens or other optical component(s), and software for creating a digital image file from a captured image. Alternatively, the camera module 122 may include the hardware needed to view an image, while a memory device of the device 100 stores instructions for execution by the controller 108 in the form of software to create a digital image file from a captured image. In an example embodiment, the camera module 122 may further include a processing element such as a co-processor, which assists the controller 108 in processing image data and an encoder and/or decoder for compressing and/or decompressing image data. The encoder and/or decoder may encode and/or decode according to a JPEG standard format or another like format. For video, the encoder and/or decoder may employ any of a plurality of standard formats such as, for example, standards associated with H.261, H.262/MPEG-2, H.263, H.264, H.264/MPEG-4, MPEG-4, and the like. In some cases, the camera module 122 may provide live image data to the display 116. Moreover, in an example embodiment, the display 116 may be located on one side of the device 100 and the camera module 122 may include a lens positioned on the opposite side of the device 100 with respect to the display 116 to enable the camera module 122 to capture images on one side of the device 100 and present a view of such images to the user positioned on the other side of the device 100.

The device 100 may further include a user identity module (UIM) 124. The UIM 124 may be a memory device having a processor built in. The UIM 124 may include, for example, a subscriber identity module (SIM), a universal integrated circuit card (UICC), a universal subscriber identity module (USIM), a removable user identity module (R-UIM), or any other smart card. The UIM 124 typically stores information elements related to a mobile subscriber. In addition to the UIM 124, the device 100 may be equipped with memory. For example, the device 100 may include volatile memory 126, such as volatile random access memory (RAM) including a cache area for the temporary storage of data. The device 100 may also include other non-volatile memory 128, which may be embedded and/or may be removable. The non-volatile memory 128 may additionally or alternatively comprise an electrically erasable programmable read only memory (EEPROM), flash memory, hard drive, or the like. The memories may store any number of pieces of information, and data, used by the device 100 to implement the functions of the device 100.

Figure 2:
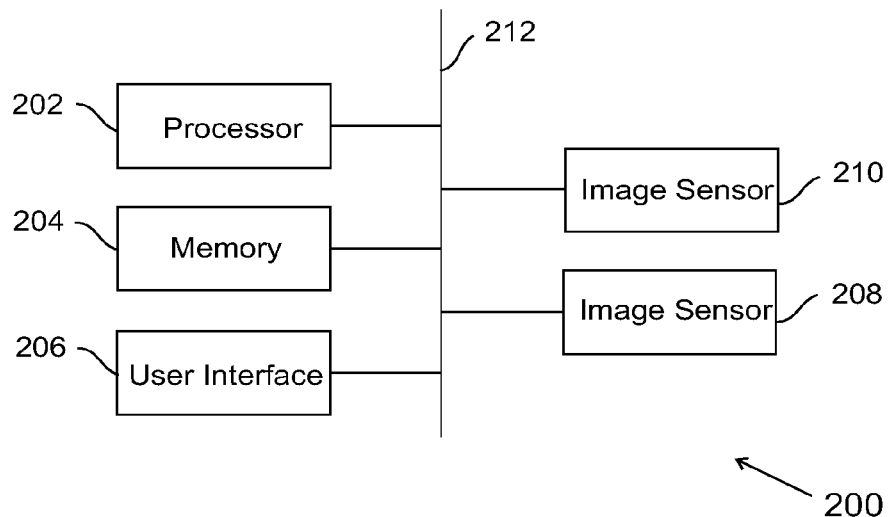
FIG. 2 illustrates an apparatus for depth estimation of stereo images, in accordance with an example embodiment.

FIG. 2 illustrates an apparatus 200 for depth estimation of stereo images, in accordance with an example embodiment. The apparatus 200 may be employed, for example, in the device 100 of FIG. 1. However, it should be noted that the apparatus 200, may also be employed on a variety of other devices both mobile and fixed, and therefore, embodiments should not be limited to application on devices such as the device 100 of FIG. 1. Alternatively, embodiments may be employed on a combination of devices including, for example, those listed above. Accordingly, various embodiments may be embodied wholly at a single device, for example, the device 100 or in a combination of devices. Furthermore, it should be noted that the devices or elements described below may not be mandatory and thus some may be omitted in certain embodiments.

The apparatus 200 includes or otherwise is in communication with at least one processor 202 and at least one memory 204. Examples of the at least one memory 204 include, but are not limited to, volatile and/or non-volatile memories. Some examples of the volatile memory include, but are not limited to, random access memory, dynamic random access memory, static random access memory, and the like. Some examples of the non-volatile memory include, but are not limited to, hard disks, magnetic tapes, optical disks, programmable read only memory, erasable programmable read only memory, electrically erasable programmable read only memory, flash memory, and the like. The memory 204 may be configured to store information, data, applications, instructions or the like for enabling the apparatus 200 to carry out various functions in accordance with various example embodiments. For example, the memory 204 may be configured to buffer input data comprising media content for processing by the processor 202. Additionally or alternatively, the memory 204 may be configured to store instructions for execution by the processor 202.

An example of the processor 202 may include the controller 108. The processor 202 may be embodied in a number of different ways. The processor 202 may be embodied as a multi-core processor, a single core processor; or combination of multi-core processors and single core processors. For example, the processor 202 may be embodied as one or more of various processing means such as a coprocessor, a microprocessor, a controller, a digital signal processor (DSP), processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an example embodiment, the multi-core processor may be configured to execute instructions stored in the memory 204 or otherwise accessible to the processor 202. Alternatively or additionally, the processor 202 may be configured to execute hard coded functionality. As such, whether configured by hardware or software methods, or by a combination thereof, the processor 202 may represent an entity, for example, physically embodied in circuitry, capable of performing operations according to various embodiments while configured accordingly. For example, if the processor 202 is embodied as two or more of an ASIC, FPGA or the like, the processor 202 may be specifically configured hardware for conducting the operations described herein. Alternatively, as another example, if the processor 202 is embodied as an executor of software instructions, the instructions may specifically configure the processor 202 to perform the algorithms and/or operations described herein when the instructions are executed. However, in some cases, the processor 202 may be a processor of a specific device, for example, a mobile terminal or network device adapted for employing embodiments by further configuration of the processor 202 by instructions for performing the algorithms and/or operations described herein. The processor 202 may include, among other things, a clock, an arithmetic logic unit (ALU) and logic gates configured to support operation of the processor 202.

A user interface 206 may be in communication with the processor 202. Examples of the user interface 206 include, but are not limited to, input interface and/or output interface. The input interface is configured to receive an indication of a user input. The output user interface provides an audible, visual, mechanical or other output and/or feedback to the user. Examples of the input interface may include, but are not limited to, a keyboard, a mouse, a joystick, a keypad, a touch screen, soft keys, and the like. Examples of the output interface may include, but are not limited to, a display such as light emitting diode display, thin-film transistor (TFT) display, liquid crystal displays, active-matrix organic light-emitting diode (AMOLED) display, a microphone, a speaker, ringers, vibrators, and the like. In an example embodiment, the user interface 206 may include, among other devices or elements, any or all of a speaker, a microphone, a display, and a keyboard, touch screen, or the like. In this regard, for example, the processor 202 may comprise user interface circuitry configured to control at least some functions of one or more elements of the user interface 206, such as, for example, a speaker, ringer, microphone, display, and/or the like. The processor 202 and/or user interface circuitry comprising the processor 202 may be configured to control one or more functions of one or more elements of the user interface 206 through computer program instructions, for example, software and/or firmware, stored on a memory, for example, the at least one memory 204, and/or the like, accessible to the processor 202.

In an example embodiment, the apparatus 200 may include an electronic device. Some examples of the electronic device include communication device, media capturing device with or without communication capabilities, computing devices, and the like. Some examples of the electronic device may include a mobile phone, a personal digital assistant (PDA), and the like. Some examples of computing device may include a laptop, a personal computer, and the like. In an example embodiment, the electronic device may include a user interface, for example, the user interface 206, having user interface circuitry and user interface software configured to facilitate a user to control at least one function of the electronic device through use of a display and further configured to respond to user inputs. In an example embodiment, the electronic device may include a display circuitry configured to display at least a portion of the user interface 206 of the electronic device. The display and display circuitry may be configured to facilitate the user to control at least one function of the electronic device.

In an example embodiment, the electronic device may be embodied as to include a transceiver. The transceiver may be any device operating or circuitry operating in accordance with software or otherwise embodied in hardware or a combination of hardware and software. For example, the processor 202 operating under software control, or the processor 202 embodied as an ASIC or FPGA specifically configured to perform the operations described herein, or a combination thereof, thereby configures the apparatus or circuitry to perform the functions of the transceiver. The transceiver may be configured to receive media content. Examples of the media content may include audio content, video content, data, and a combination thereof.

In an example embodiment, the electronic device may be embodied as to include a plurality of image sensors, such as an image sensor 208 and image sensor 210. Though only two image sensors 208 and 210 are shown in the example representation of FIG. 2, but the electronic device may include more than two image sensors. The image sensors 208 and 210 may be in communication with the processor 302 and/or other components of the apparatus 200. The image sensors 208 and 210 may be in communication with other imaging circuitries and/or software, and are configured to capture digital images or to capture video or other graphic media. The image sensors 208 and 210 and other circuitries, in combination, may be example of at least one camera module such as the camera module 222 of the device 200. The image sensors 208 and 210, along with other components may also be configured to capture a plurality of micro-images depicting a scene from different positions (or different angles). In an example embodiment, the image sensors 208 and 210 may be accompanied with corresponding lenses to capture two views of the scene, such as stereoscopic views.

These components (202-210) may communicate to each other via a centralized circuit system 212 to facilitate depth estimation of stereo images. The centralized circuit system 212 may be various devices configured to, among other things, provide or enable communication between the components (202-210) of the apparatus 200. In certain embodiments, the centralized circuit system 212 may be a central printed circuit board (PCB) such as a motherboard, main board, system board, or logic board. The centralized circuit system 212 may also, or alternatively, include other printed circuit assemblies (PCAs) or communication channel media.

In an example embodiment, the apparatus 200 is caused to perform depth estimation of stereo images. In an example embodiment, a processing means may be configured to perform depth estimation of the stereo images. An example of the processing means may include the processor 202, which may be an example of the controller 108. In this example embodiment, the processor 202 is configured to, with the content of the memory 204, and optionally with other components described herein, to cause the apparatus 200 to facilitate receipt of a primary depth map and a plurality of color segments. In an example embodiment, a processing means may be configured to facilitate receipt of a primary depth map and a plurality of color segments. An example of the processing means may include the processor 202, which may be an example of the controller 108. In this example embodiment, the primary depth map is associated with a first image (image I1) and a second image (image I2) of a scene and the plurality of color segments is associated with the first image I1. The plurality of color segments and the primary depth map may be determined by various suitable techniques and are described later in the description. Herein, the 'scene' refers to arrangement (natural, manmade, sorted or assorted) of one or more objects of which the images or videos can be captured, or of which the preview can be generated. In this example embodiment, the first image and the second image are stereoscopic pair of images of the scene captured by a device (for example, a camera module including image sensor 208 and 210). In this example embodiment, the first image and the second image are captured by the sensors 208 and 210 present or otherwise accessible to the apparatus 200. Herein, the 'stereoscopic pair of images' refer to two images of the scene captured from slightly horizontally separated points thereby generating a left view image and a right view image of the scene. In some example embodiments, the first image and the second image may be prerecorded or stored in the apparatus 200, or may be received from sources external to the apparatus 200. In such example embodiments, the apparatus 200 is caused to receive the first image and the second image from external storage medium such as DVD, Compact Disk (CD), flash drive, memory card, or from external storage locations through Internet, Bluetooth®, and the like. In an example embodiment, a processing means may be configured to facilitate capture of the first image and the second image of the scene. An example of the processing means may include the processor 202, which may be an example of the controller 108, and the image sensors 208 and 210.

In an example embodiment, the apparatus 200 is caused to generate a plurality of disparity planes for the scene based on the plurality of color segments and the primary depth map. Herein, the 'disparity planes' refer to planes that model continuous disparities of the scene in disparity space and that represent a scene structure, and herein the 'disparities' refer to horizontal relative distances between matching pixels of the first image and the second image. In this example embodiment, the plurality of disparity planes is associated with a plurality of plane labels. Herein, the 'plane labels' refer to notations or labels representing the disparity planes. For instance, one label L1 represents a disparity plane DP1 and another label L2 represents another disparity plane DP2, and so on. In an example embodiment, the plane labels may be collectively referred to as 'a label set'. In an example embodiment, each color segment is assigned a disparity plane for the scene. In an example, possible disparity planes in the scene can be estimated by obtaining initial pixel disparity through local matching analysis, computing initial plane parameters from each color segment, and refining the plane parameters through fitting to grouped color segments. Such a process is also referred to as plane fitting. Each disparity plane is referenced by three plane parameters (for example, c1, c2, and c3) that determine a disparity (d) for each pixel (for example, P(x, y)) in an image for example, image I1, given by d=c1x+c2y+c3, where d is disparity of the pixel P(x, y) in the image I1. An example of the generation of the disparity plane is set forth in Li Hong and George Chen, "Segment-based Stereo Matching Using Graph Cuts," in *Proceedings of the* 2004 *IEEE Computer Society Conference on Computer Vision and Pattern Recognition,* 2004. *CVPR* 2004. in an example embodiment, a processing means may be configured to generate a plurality of disparity planes for the scene. An example of the processing means may include the processor 202, which may be an example of the controller 108.

In an example embodiment, the apparatus 200 is caused to determine an aggregated cost volume between pixels of the first image I1 and pixels of the second image I2 for the plurality of disparity planes. In an example embodiment, the aggregated cost volume is determined by computing a cost volume which for an image, for example image I1, is an aggregation of matching costs for each pixel of the image I1, where the matching costs are calculated for the pixel for each of the plurality of disparity planes (or calculated for corresponding plane labels). For instance, if there are n number of disparity planes between the images I1 and I2 are generated by the apparatus 200, there will be n number of corresponding plane labels (for example, L1, L2 . . . Ln), where n is a non-zero natural number. In this example embodiment, the matching costs are calculated for each pixel of the images (I1 and/or I2) by assigning the n number of plane labels to the each pixel. In this example embodiment, the cost volume includes n number of matching costs for each pixel of the images (I1 and/or I2) calculated for the plane labels L1, L2 . . . Ln. In an example, a matching cost may refer to a degree of similarity (or distance) between two corresponding pixels in the images I1 and I2, where the degree of similarity (or distance) is measured in terms of intensity, color, or other image features. In an example, the cost volume is computed using a color difference method between the pixels in the first image I1 and the pixels in the second image I2. The cost volume is then aggregated to generate the aggregated cost volume using a cost aggregation method as set forth in Qingxiong Yang, "A Non-Local Cost Aggregation Method for Stereo Matching," in *CVPR* 2012, pp. 1402-1409. In this example, the aggregated cost volume is computed using a tree based aggregation method (for example, a segment tree method or a minimum spanning tree method) or a non-tree based aggregation method (for example, a horizontal and vertical guided image based aggregation and the like). In this example, the aggregated cost volume is computed by excluding a first set of occlusion pixels, where the first set of occlusion pixels refers to pixels for which there is no depth information present in the primary depth map. Some example embodiments of generating the primary depth map and the first set of occlusion pixels are described later in this description. In an example embodiment, a processing means may be configured to determine the aggregated cost volume between pixels of the first image I1 and pixels of the second image I2. An example of the processing means may include the processor 202, which may be an example of the controller 108.

In an example embodiment, the apparatus 200 is caused to assign plane labels to pixels of at least one image of the first image I1 and the second image I2 based on the aggregated cost volume. In this example embodiment, individual pixels of the images I1 and/or I2 are assigned with corresponding plane labels determined from among the plane labels. In various example embodiments, a suitable plane label may be assigned to each pixel of the images I1 and/or I2, where the suitable plane label is selected from the plurality of plane labels (L1, L2 . . . Ln). Some example embodiments of assigning suitable plane labels to the pixels are further described later in this description. In an example embodiment, plane labels are not assigned to the first set of occlusion pixels. In an example embodiment, a processing means may be configured to assign plane labels to pixels of at least one image of the first image I1 and the second image I2. An example of the processing means may include the processor 202, which may be an example of the controller 108.

In an example embodiment, the apparatus 200 is caused to generate a secondary depth map based on the plane labels assigned to the pixels of the at least one image. It should be noted that a plane label that is assigned to a pixel represents a disparity plane associated with the pixel, and hence the plane labels assigned to all pixels of the images I1 and/or I2 provide secondary depth map for the images I1 and/or I2. It should be noted that the secondary depth map is a refined depth map as compared to the primary depth map. In an example embodiment, a processing means may be configured to generate a secondary depth map based on the plane labels. An example of the processing means may include the processor 202, which may be an example of the controller 108.

Some example embodiments of facilitating receipt of the primary depth map and the plurality of color segments, assigning plane labels and generating the secondary depth map are further provided in the following description.

In an example embodiment of facilitating receipt of the primary depth map and the plurality of color segments, the apparatus 200 is caused to facilitate receipt of the first image I1 and the second image I2 of the scene. In an example embodiment, a processing means may be configured to facilitate receipt of the first image I1 and the second image I2. An example of the processing means may include the processor 202, which may be an example of the controller 108. In this example embodiment of facilitating receipt of the primary depth map and the plurality of color segments, the apparatus 200 is caused to determine a primary cost volume between the pixels of the first image I1 and the pixels of the second image I2 for a plurality of disparity values (for example, d1, d2 . . . dm, where m is non-zero natural number). The primary cost volume includes a plurality of matching costs for each pixel of the first image I1 and the second image I2, calculated for the plurality of disparity values d1, d2 . . . dm. In an example embodiment, a processing means may be configured to determine the primary cost volume between the pixels of the first image I1 and the pixels of the second image I2 for the plurality of disparity values. An example of the processing means may include the processor 202, which may be an example of the controller 108.

In this example embodiment of facilitating receipt of the primary depth map and the plurality of color segments, the apparatus 200 is caused to determine the plurality of color segments for the first image I1, and determine a first segment tree for the first image I1 and a second segment tree for the second image I2. In an example embodiment, a plurality of color segments is determined for the first image I1. Herein, the 'plurality of color segments' for an image, for example the first image I1, refers to non-overlapping homogeneous color segments that are segmented based on difference in color intensities between pixels of the first image I1. In an example, suitable techniques, including but not limited to, a segment tree segmentation algorithm can be used to determine the plurality of color segments. In an example, the plurality of color segments may be determined based on an assumption that there are no large disparity discontinuities present within the homogeneous color segments, but such discontinuities may occur on boundaries of the homogeneous color segments. In this example, the first segment tree is generated by grouping the pixels of the first image I1 into the plurality of color segments of the first image I1, creating a sub-tree for each color segment of the plurality of color segments of the first image I1, and linking sub-trees for each of plurality of the color segments in the first image I1 to form the first segment tree. Similarly, in this example, the second segment tree is constructed by grouping the pixels of the second image I2 into the plurality of color segments of the second image I2, creating a sub-tree for each color segment of the plurality of color segments of the second image I2, and linking sub-trees for each of plurality of the color segments in the second image I2 to form the second segment tree. An example representation of the generation of a segment tree (for example, the first segment tree and the second segment tree) is set forth in Xing Mei, Xun Sun, Weiming Dong, Haitao Wang, and Xiaopeng Zhang, "Segment-Tree based Cost Aggregation for Stereo Matching," in *CVPR*2013, pp. 313-319. In an example embodiment, a processing means may be configured to determine the plurality of color segments for the first image I1, and determine a first segment tree for the first image I1 and a second segment tree for the second image I2. An example of the processing means may include the processor 202, which may be an example of the controller 108.

In this example embodiment of facilitating receipt of the primary depth map and the plurality of color segments, the apparatus 200 is caused to aggregate the primary cost volume based on the first segment tree to generate a first aggregated cost volume for the first image I1 and is caused to aggregate the primary cost volume based on the second segment tree to generate a second aggregated cost volume for the second image I2. In an example embodiment, for an image, for example, the first image I1, aggregated costs are performed for each pixel (that is represented by node in the first segment tree) of the first image I1 at each of the plurality of disparity values (d1, d2 . . . dm) to generate the first aggregated cost volume. Similarly, in an example embodiment, the second image I2, the aggregated costs are performed for each pixel (that is represented by node in the second segment tree) of the second image I2 at each of the plurality of disparity values (d1, d2 . . . dm) to generate the second aggregated cost volume. In an example embodiment, a processing means may be configured to aggregate the primary cost volume based on the first segment tree to generate a first aggregated cost volume for the first image I1 and is configured to aggregate the primary cost volume based on the second segment tree to generate a second aggregated cost volume for the second image I2. An example of the processing means may include the processor 202, which may be an example of the controller 108.

In this example embodiment of facilitating receipt of the primary depth map and the plurality of color segments, the apparatus 200 is caused to determine a first depth map based on determining a least matching cost for each pixel of the first image I1 from the first aggregated cost volume. In this example embodiment of facilitating receipt of the primary depth map and the plurality of color segments, the apparatus 200 is caused to determine a second depth map based on determining a least matching cost for each pixel of the second image I2 from the second aggregated cost volume. In an example embodiment, a processing means may be configured to determine a first depth map based on determining a least matching cost for each pixel of the first image I1 from the first aggregated cost volume, and configured to determine a second depth map based on determining a least matching cost for each pixel of the second image I2 from the second aggregated cost volume. An example of the processing means may include the processor 202, which may be an example of the controller 108.

In this example embodiment of facilitating receipt of the primary depth map and the plurality of color segments, the apparatus 200 is caused to compare the first depth map and the second depth map to generate the primary depth map and the first set of occlusion pixels between the first image and the second image. In an example, the primary depth map is same as the first depth map or the second depth map, however as opposed to the first depth map and/or the second depth map, the primary depth map does not have depth information for the first set of occlusion pixels determined based on the comparison of the first depth map and the second depth map. Herein, the 'occlusion pixels' refer to outliers or pixels with unreliable disparity that are detected by comparing or cross-checking the first depth map and the second depth map. In an example embodiment, the first depth map and the second depth map are compared to each other for consistency to determine the first set of occlusion pixels and to generate the primary depth map. In an example embodiment, a processing means may be configured to compare the first depth map and the second depth map to generate the primary depth map and the first set of occlusion pixels between the first image and the second image. An example of the processing means may include the processor 202, which may be an example of the controller 108.

In an alternate example embodiment of facilitating receipt of the primary depth map and the plurality of color segments, the apparatus 200 is caused to facilitate receipt of the first image I1 and the second image I2 of the scene. In this alternate embodiment of facilitating receipt of the primary depth map and the plurality of color segments, the apparatus 200 is caused to determine the primary cost volume between pixels of the first image I1 and pixels of the second image I2 for the plurality of disparity values (d1 . . . dm).

In this alternate example embodiment of facilitating receipt of the primary depth map and the plurality of color segments, the apparatus 200 is caused to determine the plurality of color segments associated with the first image I1. In an example embodiment, a plurality of color segments is determined for the first image I1. In an example, suitable techniques, including but not limited to, a mean-shift color segmentation, and a super pixel based color segmentation. In an example, color segments may be determined based on an assumption that there are no large disparity discontinuities within the homogeneous color segments but which occur only on boundaries of the homogeneous color segments.

In this alternate example embodiment of facilitating receipt of the primary depth map and the plurality of color segments, the apparatus 200 is caused to determine a first depth map based on determining a least matching cost of the plurality of matching costs for the each pixel of the first image I1 (from the primary cost volume). In this alternate example embodiment of facilitating receipt of the primary depth map and the plurality of color segments, the apparatus 200 is caused to determine a second depth map based on determining a least matching cost of the plurality of matching costs for the each pixel of the second image I2 (from the primary cost volume).

In this alternate example embodiment of facilitating receipt of the primary depth map and the plurality of color segments, the apparatus 200 is caused to compare the first depth map and the second depth map to generate the primary depth map and the first set of occlusion pixels between the first image and the second image. In an example, the primary depth map is same as the first depth map or the second depth map, however as opposed to the first depth map and/or the second depth map, the primary depth map does not have depth information for the first set of occlusion pixels determined based on the comparison of the first depth map and the second depth map. In an example embodiment, the first depth map and the second depth map are compared to each other for consistency to determine the first set of occlusion pixels and the primary depth map.

In this example embodiment of assigning the plane labels to the pixels of the at least one image (for example, the images I1 and/or image I2), the apparatus 200 is caused to determine least label matching costs for the pixels of the at least one image (images I1 and/or I2) from the aggregated cost volume based on a segment tree of the at least one image of the first image I1 and the second image I2. In an example embodiment, the aggregated cost volume includes a plurality of label matching costs associated with the plurality of plane labels (L1, L2 . . . Ln), where the plurality of label matching costs are computed for each pixel of the at least one image (the images I1 and/or I2). In an example embodiment, a processing means may be configured to determine least label matching costs for the pixels of the at least one image (images I1 and/or I2) from the aggregated cost volume based on a segment tree of the at least one image of the first image I1 and the second image I2. An example of the processing means may include the processor 202, which may be an example of the controller 108. In this example embodiment of assigning the plane labels to the pixels, the apparatus 200 is caused to select the plane labels associated with the least label matching costs for assigning the plane labels to the pixels. For instance, if for a pixel P(x,y) the least matching cost is determined for the plane label L3 from among the plane labels (L1, L2 . . . Ln), the plane label L3 is assigned to the pixel P(x,y). In an example embodiment, a processing means may be configured to select the plane labels associated with the least label matching costs for assigning the plane labels to the pixels. An example of the processing means may include the processor 202, which may be an example of the controller 108.

In an alternate example embodiment of assigning the plane labels to the pixels, in assigning the plane labels to the pixels of the at least one image (images I1 and/or I2), the apparatus 200 is caused to determine least label matching costs for the pixels of the at least one image from the cost volume instead of from the aggregated cost volume. In an example embodiment, a processing means may be configured to determine least label matching costs for the pixels of the at least one image from the cost volume instead of from the aggregated cost volume. An example of the processing means may include the processor 202, which may be an example of the controller 108. In this alternate example embodiment of assigning the plane labels to the pixels, the apparatus 200 is caused to select the plane labels associated with the least label matching costs for assigning the plane labels to the pixels. In an example embodiment, a processing means may be configured to select the plane labels associated with the least label matching costs for assigning the plane labels to the pixels. An example of the processing means may include the processor 202, which may be an example of the controller 108.

In some example embodiments, the secondary depth map is further refined in one or more iterations. In each iteration, the secondary depth map is refined by generating an updated set of disparity planes and assigning plane labels to the pixels of the images I1 and/or I2 based on the updated set of disparity planes, where the updated set of disparity planes are generated based on the secondary depth map generated in immediate preceding iteration. For instance, as described in preceding description, for a first iteration, the plurality of disparity planes is generated based on the plurality of color segments and the primary depth map. In this example, for an $i^{th}$ iteration (i being a natural number that is more than one), the plurality of disparity planes are generated based on the plurality of color segments and the secondary depth map generated at an $i-1^{th}$ iteration. In this example embodiment, the secondary depth map generated at the $i^{th}$ iteration is a refined depth map as compared to the secondary depth map generated at the $(i-1)^{th}$ iteration. An example representation of this embodiment is also described with reference to FIG. 7.

In such example embodiments of refining the secondary depth map, the apparatus 200 is caused to generate the plurality of disparity planes, determine the aggregated cost volume, assign the plane labels, and generate the secondary depth map in one or more iterations based on a pre-determined condition. In an example, the pre-determined condition may include a threshold number of iterations, for example, 2, 3, 4 etc. In another example, the pre-determined condition may be satisfied if there are no changes in the secondary depth map generated at a current iteration (for example, $i^{th}$ iteration) and an immediate preceding iteration (for example, $i-1^{th}$ iteration).

In an example embodiment, the apparatus 200 is caused to assign plane labels to the first set of occlusion pixels based on plane labels of neighboring pixels of the first set of occlusion pixels so that the plane labels assigned to the first set of occlusion pixels are included in the secondary depth map. In an example embodiment, a processing means may be configured to assign plane labels to the first set of occlusion pixels based on plane labels of neighboring pixels of the first set of occlusion pixels. An example of the processing means may include the processor 202, which may be an example of the controller 108. In this example embodiment, the apparatus 200 is caused to include depth values corresponding to the plane labels assigned to the first set of occlusion pixels, in the secondary depth map. In this example embodiment, the apparatus 200 is caused to compute plane labels for the first set of occlusion pixels by assigning a zero value to a cost for all plane labels for the first set of occlusion pixels and using it in a cost aggregation framework, and by enabling an output plane label for an occlusion pixel of the first set of occlusion pixels to be filled with that of neighboring plane labels based on color similarity of the occlusion pixel with respect to a neighboring pixel. In an example embodiment, the apparatus 200 is also caused to determine a dominant disparity plane from the secondary depth map. Herein, the 'dominant disparity plane' refers to a plane covering a majority of pixels in an image. In an example embodiment, a processing means may be configured to include depth values corresponding to the plane labels assigned to the first set of occlusion pixels, to compute plane labels for the first set of occlusion pixels by assigning a zero value to a cost for all plane labels for the first set of occlusion pixels, and to determine a dominant disparity plane. An example of the processing means may include the processor 202, which may be an example of the controller 108.

Figure 3:
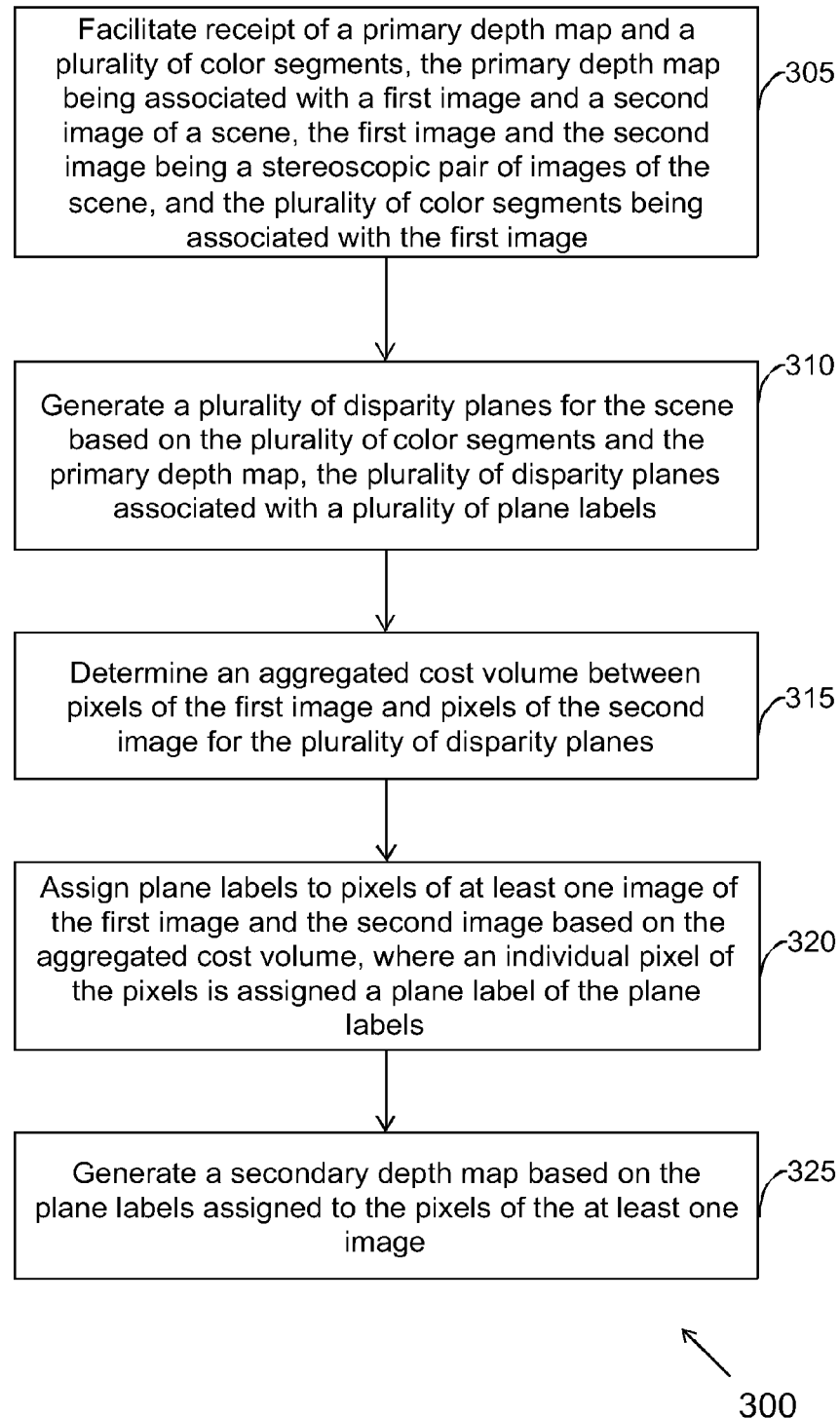
FIG. 3 is a flowchart depicting an example method for depth estimation of stereo images, in accordance with an example embodiment.

FIG. 3 is a flowchart depicting an example method 300 for depth estimation of stereo images, in accordance with an example embodiment. In an example embodiment, the method 300 includes depth estimation of stereo images. The method 300 is shown and explained with reference to FIG. 2. The method 300 depicted in the flow chart may be executed by, for example, the apparatus 200 of FIG. 2.

At 305, the method 300 includes facilitating receipt of the primary depth map and the plurality of color segments. In an example embodiment, the primary depth map is associated with a first image (I1) a second image (I2) of a scene, and the plurality of color segments is associated with the first image I1, where the first image I1 and the second image I2 are a stereoscopic pair of images of the scene. The first image I1 and the second image I2 are captured by image sensors, for example, image sensors 208 and 210. The plurality of color segments and the primary depth map may be determined by various suitable techniques as described with reference to FIG. 2 and as further described with reference to FIGS. 4 and 5.

At 310, the method 300 includes generating a plurality of disparity planes for the scene based on the plurality of color segments and the primary depth map. In an example embodiment, the plurality of disparity planes is associated with a plurality of plane labels. For instance, a label L1 represents a disparity plane DP1 and a label L2 represents a disparity plane DP2, and so on. In an example embodiment, each color segment is assigned a disparity plane for the scene. In an example, possible disparity planes in the scene can be estimated by obtaining initial pixel disparity through local matching analysis, computing initial plane parameters from each color segment, and refining the plane parameters through fitting to grouped color segments. Such a process is also referred to as plane fitting. Each disparity plane is referenced by three plane parameters (for example, c1, c2, and c3) that determine a disparity (d) for each pixel (for example, P(x, y)) in an image, for example, image 1, given by $d=c1x+c2y+c3$, where d is disparity of the pixel P(x, y) in the image I1.

At 315, the method 300 includes determining an aggregated cost volume between pixels of the first image I1 and pixels of the second image I2 for the plurality of disparity planes. In an example embodiment, the aggregated cost volume for an image, for example image I1, is determined from computing a cost volume that is an aggregation of matching costs for each pixel of the image I1, where the matching costs are calculated for the pixel for each of the plurality of disparity planes (or calculated for corresponding plane labels). As described with reference to FIG. 2, if there are n number of disparity planes generated between the images I1 and I2, there will be n number of corresponding plane labels (for example, L1, L2 . . . Ln), where n is a non zero natural number. In this example embodiment, matching costs are calculated for each pixel of the images (I1 and/or I2) by assigning the n number of plane labels to the each pixel. In this example embodiment, the cost volume includes n number of matching costs for each pixel of the images (I1 and/or I2). In an example, a matching cost may refer to a degree of similarity (or distance) between two corresponding pixels in the images I1 and I2, where the degree of similarity (or distance) is measured in terms of intensity, color, or other image features. The cost volume is then aggregated to generate the aggregated cost volume of the at least one image (for example, the first image I1 and/or the second image I2) based on aggregations techniques know in the art, for example, segment tree method.

At 320, the method 300 includes assigning plane labels to pixels of at least one image of the first image I1 and the second image I2 based on the aggregated cost volume, where each individual pixel of the images I1 and/or I2 is assigned a plane label selected from among the plane labels (L1, L2 . . . Ln).

In an example embodiment, the operation of the block 320 may be performed by determining least label matching costs for the pixels of the at least one image (images I1 and/or I2) from the aggregated cost volume based on a segment tree of the at least one image of the first image I1 and the second image I2. In an example embodiment, the aggregated cost volume includes a plurality of label matching costs associated with the plurality of plane labels (L1, L2 . . . Ln), where the plurality of label matching costs are computed for each pixel of the at least one image (the images I1 and/or I2). In this example embodiment, the apparatus 200 is caused to select the plane labels associated with the least label matching costs for assigning the plane labels to the pixels. For instance, if for a pixel P(x,y) the least matching cost is determined for the plane label L3 from among the plane labels (L1, L2 . . . Ln), the plane label L3 is assigned to the pixel P(x,y). In an example embodiment, a processing means may be configured to select the plane labels associated with the least label matching costs for assigning the plane labels to the pixels. An example of the processing means may include the processor 202, which may be an example of the controller 108.

In an alternate example embodiment, the operation of the block 320 may be performed by determining least label matching costs for the pixels of the at least one image from the cost volume instead of the aggregated cost volume. In this alternate example embodiment, the block 320 includes selecting the plane labels associated with the least label matching costs for assigning the plane labels to the pixels, using techniques such as winner take all.

At 325, the method 300 includes generating a secondary depth map based on the plane labels assigned to the pixels of the at least one image (images I1 and/or I2). It should be noted that a plane label that is assigned to a pixel represents a disparity plane associated with the pixel, and hence the plane labels assigned to all pixels of the images I1 and I2 provide the secondary depth map for the images I1 and/or I2. It should be noted that the secondary depth map is a refined depth map as compared to the primary depth map.

In an example embodiment, operations of the block 325 further comprises assigning plane labels to the first set of occlusion pixels based on plane labels of neighboring pixels of the first set of occlusion pixels so that the plane labels for the first set of occlusion pixels are included in the secondary depth map. For instance, the generation of the secondary depth map at block 325 also includes assigning plane labels to the first set of occlusion pixels based on plane labels of neighboring pixels of the first set of occlusion pixels, and including depth values corresponding to the first set of occlusion pixels in the secondary depth map, where the depth values correspond to the assigned plane labels to the first set of occlusion pixels. In an example embodiment, the method 400 also includes determining a dominant disparity plane from the secondary depth map.

In an example embodiment, the method 300 includes extracting a dominant disparity plane from the secondary depth map. Herein, the 'dominant disparity plane' refers to a plane covering a majority of pixels in an image. In various scenarios, the dominant plane may be used in gaming and virtual reality based applications.

Figure 4:
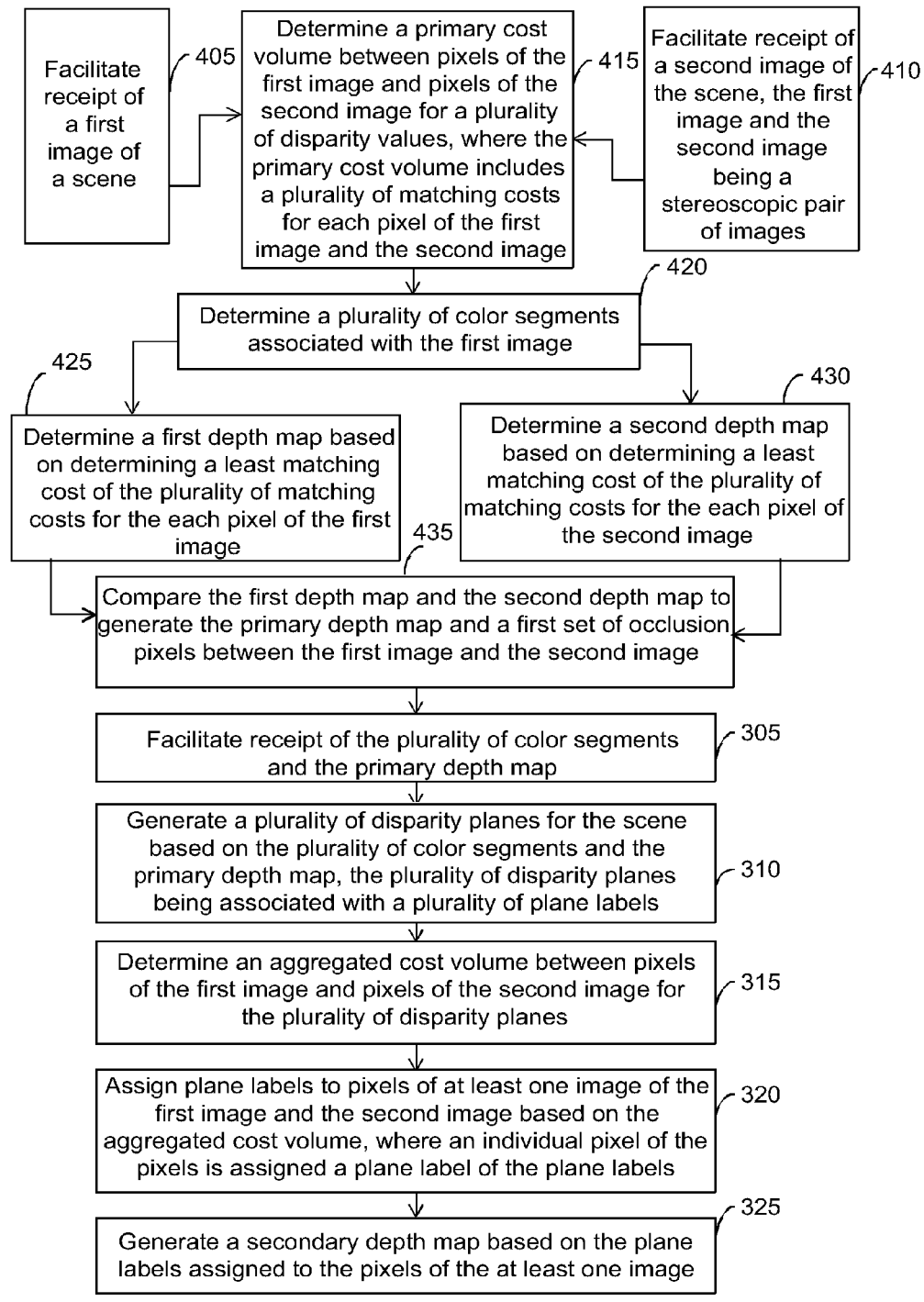
FIG. 4 is a flowchart depicting an example method for depth estimation of stereo images, in accordance with another example embodiment.

FIG. 4 is a flowchart depicting an example method 400 for depth estimation of stereo images, in accordance with another example embodiment. Example references are made to FIG. 2 for the description of the method 400. The method 400 depicted in the flow chart may be executed by, for example, the apparatus 200 of FIG. 2.

At 405, the method 400 includes facilitating receipt of a first image (I1) of a scene. The first image I1 is captured by a first image sensor (for example, the sensor 208). At 410, the method 400 includes facilitating receipt of a second image (I2) of the scene. The second image I2 is captured by a second image sensor (for example, the sensor 210). In an example embodiment, the first image I1 and the second image I2 are a stereoscopic pair of images of the scene. In this example, the first image I1 and the second image I2 are captured by using a stereoscopic camera including sensors such as the sensors 208 and 210. In an example embodiment, the images I1 and I2 are captured simultaneously by the sensors 208 and 210. It should be noted that though the operations of the blocks 405 and 410 are shown separately, but the images I1 and I2 may be captured by a same capture instruction and at a same time.

At 415, the method 400 includes determining a primary cost volume between pixels of the first image I1 and pixels of the second image I2 for a plurality of disparity values (d1, d2 . . . dm). In an example embodiment, the primary cost volume includes a plurality of matching costs for each pixel of the first image I1 and the second image I2, calculated for the plurality of disparity values d1, d2 . . . dm.

At 420, the method 400 includes determining a plurality of color segments associated with the first image I1. In an example, suitable techniques, including but not limited to, a mean-shift color segmentation algorithm and matching corresponding pixels between images can be used to determine the plurality of color segments.

At 425, the method 400 includes determining a first depth map based on determining a least matching cost of the plurality of matching costs for the each pixel of the first image I1 (from the primary cost volume). At 430, the method 400 includes determining a second depth map based on determining a least matching cost of the plurality of matching costs for the each pixel of the second image I2 (from the primary cost volume). In an example embodiment, determining the least matching cost for each pixel of the first image and for each pixel of the second image is a winner-take-all optimization method used for depth map determination.

At 435, the method 400 includes comparing the first depth map and the second depth map to generate the primary depth map and a first set of occlusion pixels between the first image I1 and the second image I2. In an example embodiment, the primary depth map is generated by comparing/cross-checking disparity values between the first image I1 and the second image I2. In an example embodiment, the first set of occlusion pixels is generated by determining pixels that are not matched between the first depth map and second depth map.

The operations performed at block 305 to block 325 are then performed after block 435 to generate the secondary depth map, as already described with reference to FIG. 3. In an example embodiment, the generation of the secondary depth map also includes assigning plane labels to the first set of occlusion pixels based on plane labels of neighboring pixels of the first set of occlusion pixels, and including depth values corresponding to the first set of occlusion pixels in the secondary depth map, where the depth values correspond to the assigned plane labels to the set of occlusion pixels. In an example embodiment, the method 400 also includes determining a dominant disparity plane from the secondary depth map.

Figure 5:
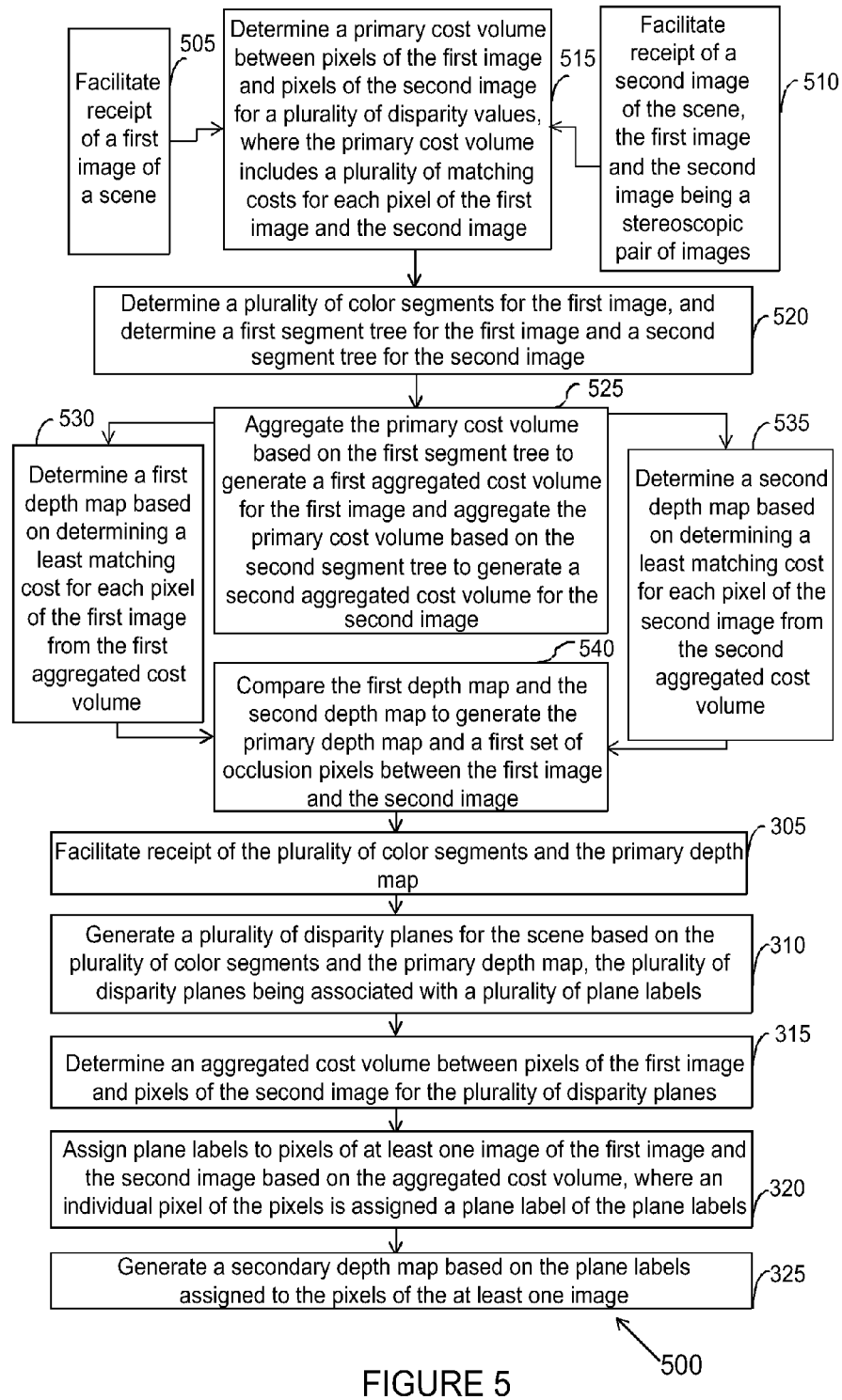
FIG. 5 is a flowchart depicting an example method for depth estimation of stereo images, in accordance with another example embodiment.

FIG. 5 is a flowchart depicting an example method 500 for depth estimation of stereo images, in accordance with another example embodiment. Example references are made to FIG. 2 for the description of the method 500. The method 500 depicted in the flow chart may be executed by, for example, the apparatus 200 of FIG. 2.

At 505, the method 500 includes facilitating receipt of a first image (I1) of a scene. The first image is captured by a first image sensor (for example, the sensor 208). At 510, the method 500 includes facilitating receipt of a second image (I2) of the scene. The second image I2 is captured by a second image sensor (for example, the sensor 210). In an example embodiment, the first image I1 and the second image I2 are a stereoscopic pair of images. An example of the operation of the block 505 is the operation performed at the block 405, and an example of the operation of the block 510 is the operation performed at the block 410.

At 515, the method 500 includes determining a primary cost volume between pixels of the first image I1 and pixels of the second image I2 for a plurality of disparity values (d1, d2 . . . dm). In an example embodiment, the primary cost volume includes a plurality of matching costs for each pixel of the first image I1 and the second image I2, calculated for the plurality of disparity values d1, d2 . . . dm. An example of the operation of the block 515 is the operation performed at the block 415.

At 520, the method 500 includes determining a plurality of color segments for the first image I1, and determining a first segment tree for the first image I1 and a second segment tree for the second image I2. As described with reference to FIG. 2, suitable techniques, including but not limited to, a segment tree segmentation algorithm can be used to determine the plurality of color segments.

At 525, the method 500 includes aggregating the primary cost volume based on the first segment tree to generate a first aggregated cost volume for the first image I1 and aggregating the primary cost volume based on the second segment tree to generate a second aggregated cost volume for the second image I2. In an example embodiment, the first aggregated cost volume and the second aggregated cost volume is generated as set forth in Qingxiong Yang, "A Non-Local Cost Aggregation Method for Stereo Matching," in *CVPR*2012, pp. 1402-1409.

At 530, the method 500 includes determining a first depth map based on determining a least matching cost for each pixel of the first image I1 from the first aggregated cost volume. At 535, the method 500 includes determining a second depth map based on determining a least matching cost for each pixel of the second image I2 from the second aggregated cost volume. In an example embodiment, determining the least matching cost for each pixel of the first image I1 and for each pixel of the second image I2 is a winner-take-all optimization method used for depth map determination.

At 540, the method 500 includes comparing the first depth map and the second depth map to generate the primary depth map and a first set of occlusion pixels between the first image I1 and the second image I2. In an example embodiment, the primary depth map is generated by comparing/cross-checking disparity values between the first image I1 and the second image I2. In an example embodiment, the first set of occlusion pixels is generated by determining pixels that are not matched between the first depth map and second depth map. An example of the operation of the block 540 is the operation performed at the block 435.

The operations performed at block 305 to block 325 are then performed after block 540 to generate the secondary depth map, as already described with reference to FIG. 3. In an example embodiment, the generation of the secondary depth map also includes assigning plane labels to the first set of occlusion pixels based on plane labels of neighboring pixels of the first set of occlusion pixels, and including depth values corresponding to the first set of occlusion pixels in the secondary depth map, where the depth values correspond to the assigned plane labels to the set of occlusion pixels. In an example embodiment, the method 500 also includes determining a dominant disparity plane from the secondary depth map.

Figure 6:
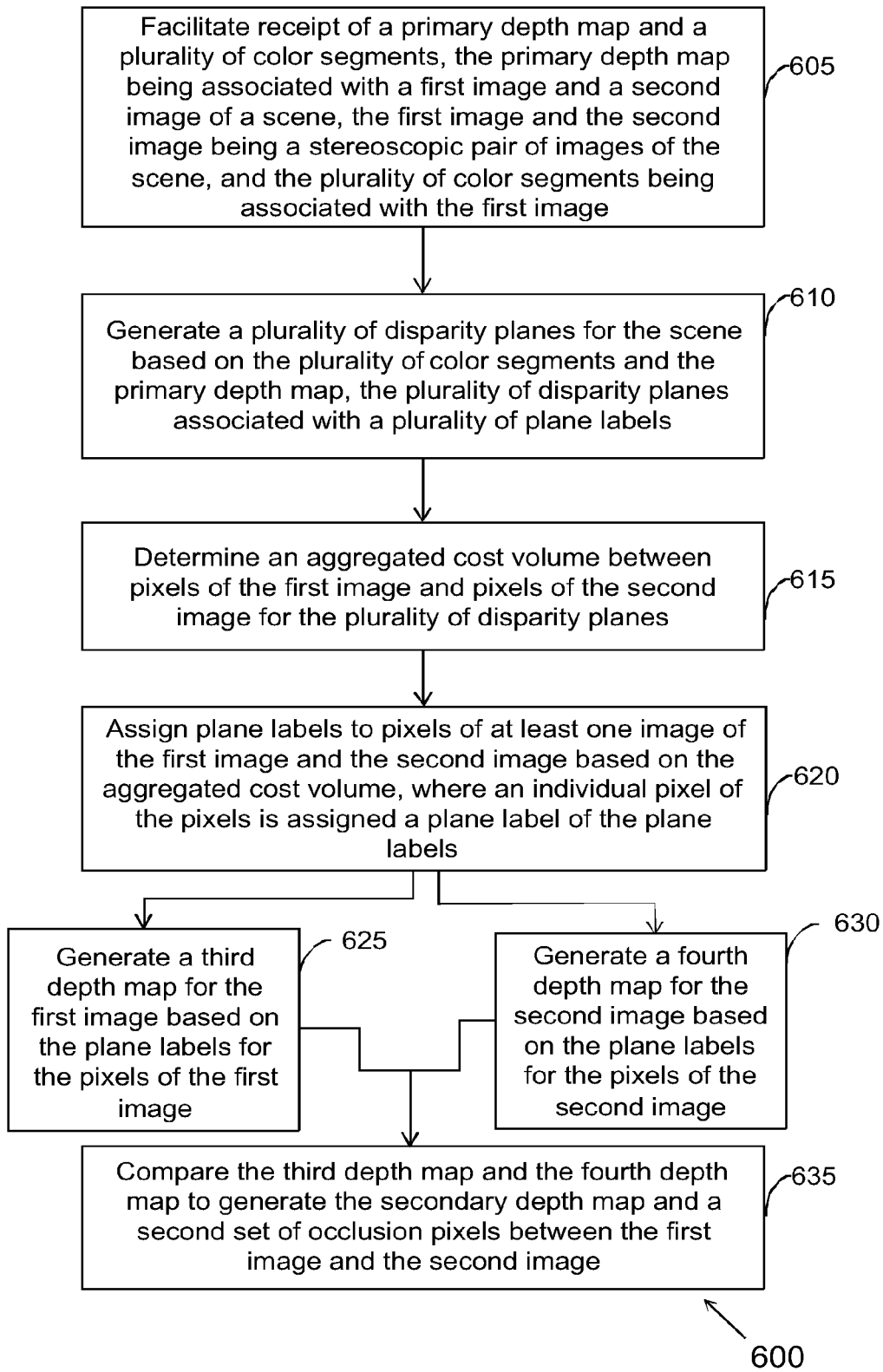
FIG. 6 is a flowchart depicting an example method for depth estimation, in accordance with another example embodiment.

FIG. 6 is a flowchart depicting an example method 600 for depth estimation of stereo images, in accordance with another example embodiment. In an example embodiment, the method 600 includes determining a secondary depth map for depth estimation of stereo images. The method 600 is shown and explained with reference to FIG. 2. The method 600 depicted in the flow chart may be executed by, for example, the apparatus 200 of FIG. 2.

At 605, the method 600 includes facilitating receipt of the primary depth map and the plurality of color segments. An example of the operation of the block 605 is the operation performed at the block 305. At 610, the method 600 includes generating a plurality of disparity planes for the scene based on the plurality of color segments and the primary depth map. An example of the operation of the block 610 is the operation performed at block 310. At 615, the method 600 includes determining an aggregated cost volume between pixels of the first image I1 and pixels of the second image I2 for the plurality of disparity planes. An example of the operation of the block 615 is the operation performed at the block 315.

At 620, the method 600 includes assigning plane labels to pixels of the first image I1 and plane labels to the pixels of the second image I2 based on the aggregated cost volume. Assignment of the plane labels to the pixels of the images I1 and/or I2 have been described with reference to FIG. 2.

At 625, the method 600 includes generating a third depth map for the first image I1 based on the plane labels assigned to the pixels of the first image I1. It should be noted that a plane label that is assigned to a pixel of the first image I1 represents a disparity plane associated with the pixel, and hence the plane labels assigned to all pixels of the image I1 provides the third depth map. At 630, the method 600 includes generating a fourth depth map for the second image I2 based on the plane labels assigned to the pixels of the second image I2. It should be noted that a plane label that is assigned to a pixel of the image I2 represents a disparity plane associated with the pixel, and hence the plane labels assigned to all pixels of the image I2 provides the fourth depth map.

At 635, the method 600 includes comparing the third depth map and the fourth depth map to generate the secondary depth map and a second set of occlusion pixels between the first image and the second image. In an example embodiment, the secondary depth map is generated by comparing/cross-checking disparity values between the third depth map and the fourth depth map. In an example embodiment, the second set of occlusion pixels is generated by determining pixels that are not matched between the third depth map and fourth depth map.

In an example embodiment, operation of the block 635 further comprises assigning plane labels to the second set of occlusion pixels based on plane labels of neighboring pixels of the second set of occlusion pixels so that the plane labels for the second set of occlusion pixels are included in the secondary depth map. For instance, the generation of the secondary depth map at block 635 also includes assigning plane labels to the second set of occlusion pixels based on plane labels of neighboring pixels of the second set of occlusion pixels, and including depth values corresponding to the second set of occlusion pixels in the secondary depth map, where the depth values correspond to the assigned plane labels to the second set of occlusion pixels. In an example embodiment, the method 600 also includes determining a dominant disparity plane from the secondary depth map.

In some example embodiments, the secondary depth map (that is generated in the flow-diagrams 300, 400, 500 and 600) is further refined in one or more iteration. In each iteration, the secondary depth map is refined by generating an updated set of disparity planes and assigning plane labels to the pixels of the images I1 and/or I2 based on the updated set of disparity planes, where the updated set of disparity planes are generated based on the secondary depth map generated in immediate preceding iteration. For instance, for a first iteration, the plurality of disparity planes is generated based on the plurality of color segments and the primary depth map. In this example, for an $i^{th}$ iteration (i being a natural number that is more than one), the plurality of disparity planes are generated based on the plurality of color segments and the secondary depth map generated at the $(i-1)^{th}$ iteration. In this example embodiment, the secondary depth map generated for the $i^{th}$ iteration is a refined depth map as compared to the secondary depth map generated at the i−1$^{th}$ iteration. An example representation of this embodiment is shown in FIG. 7.

Figure 7:
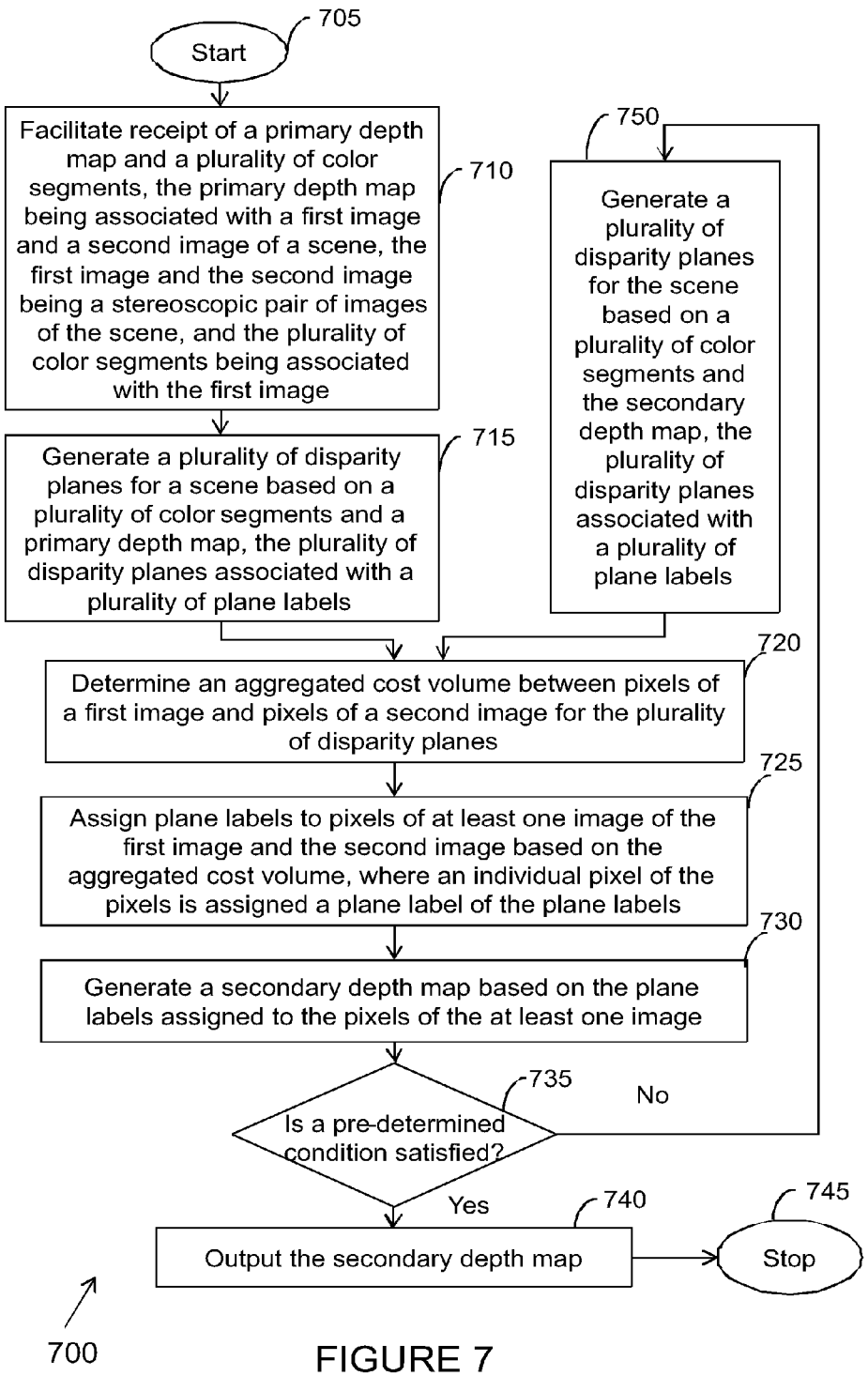
FIG. 7 is a flowchart depicting an example method for depth estimation of stereo images, in accordance with another example embodiment.

FIG. 7 is a flowchart depicting an example method 700 for depth estimation of stereo images, in accordance with an example embodiment. The method 700 is shown and explained with reference to FIG. 2. The method 700 depicted in the flow chart may be executed by, for example, the apparatus 200 of FIG. 2.

The method 700 starts at 705. At 710, the method 700 includes facilitating receipt of the primary depth map and the plurality of color segments. In an example embodiment, the primary depth map is associated with a first image (I1) and a second image (I2) of a scene, the plurality of color segments is associated with the first image I1, where the first image I1 and the second image I2 are a stereoscopic pair of images of the scene. An example of the operation of the block 710 is the operation performed at the block 305. At 715, the method 700 includes generating a plurality of disparity planes for a scene based on the plurality of color segments and the primary depth map. In an example embodiment, the plurality of disparity planes is associated with a plurality of plane labels. An example of the operation of the block 715 is the operation performed at the block 310.

At 720, the method 700 includes determining an aggregated cost volume between pixels of the first image I1 and pixels of the second image I2 for the plurality of disparity planes. An example of the operation of the block 720 is the operation performed at the block 315. At 725, the method 700 includes assigning plane labels to pixels of at least one image of the first image I1 and the second image I2 based on the aggregated cost volume. An example of the operation of the block 725 is the operation performed at the block 320.

At 730, the method 700 includes generating the secondary depth map based on the plane labels assigned to the pixels of the at least one image. An example of the operation of the block 730 is the operation performed at the block 325.

At 735, the method 700 includes checking if a pre-determined condition is satisfied. If the pre-determined condition is satisfied, operation of the block 740 is performed else operation of the block 750 is performed. In an example embodiment, the pre-determined condition may include a threshold number of iterations, for example, 2, 3, 4 etc. In another example embodiment, the pre-determined condition may be satisfied if there are no changes in the secondary depth map generated at a current iteration (for example, i$^{th}$ iteration) and a preceding iteration (for example, i−1$^{th}$ iteration). At 740, the method 700 includes outputting the secondary depth map. The method 700 stops at 745.

At 750, the method 700 includes generating a plurality of disparity planes for the scene based on the plurality of color segments and the secondary depth map. In an example embodiment, the plurality of disparity planes may be slightly different than the plurality of disparity planes generated at the block 715. For instance, the plurality of disparity planes may be an updated plurality of disparity planes that are generated based on the secondary depth map generated at a preceding iteration. In this example embodiment, blocks 720, 725 and 730 are further performed to generate the secondary depth map. Once, the pre-defined condition is satisfied, the method 700 provides the secondary depth map as output at 740, and the method 700 stops at 745.

It should be noted that to facilitate discussions of the flowcharts of FIGS. 3 to 7, certain operations are described herein as constituting distinct steps performed in a certain order. Such implementations are examples only and non-limiting in scope. Certain operation may be grouped together and performed in a single operation, and certain operations can be performed in an order that differs from the order employed in the examples set forth herein. Moreover, certain operations of the methods 300, 400, 500, 600 and 700 are performed in an automated fashion. These operations involve substantially no interaction with the user. Other operations of the methods 300, 400, 500, 600 and 700 may be performed by in a manual fashion or semi-automatic fashion. These operations involve interaction with the user via one or more user interface presentations.

The methods depicted in these flow charts may be executed by, for example, the apparatus 200 of FIG. 2. Operations of the flowchart, and combinations of operation in the flowcharts, may be implemented by various means, such as hardware, firmware, processor, circuitry and/or other device associated with execution of software including one or more computer program instructions. For example, one or more of the procedures described in various embodiments may be embodied by computer program instructions. In an example embodiment, the computer program instructions, which embody the procedures, described in various embodiments may be stored by at least one memory device of an apparatus and executed by at least one processor in the apparatus. Any such computer program instructions may be loaded onto a computer or other programmable apparatus (for example, hardware) to produce a machine, such that the resulting computer or other programmable apparatus embody means for implementing the operations specified in the flowchart. These computer program instructions may also be stored in a computer-readable storage memory (as opposed to a transmission medium such as a carrier wave or electromagnetic signal) that may direct a computer or other programmable apparatus to function in a particular manner, such that the instructions stored in the computer-readable memory produce an article of manufacture the execution of which implements the operations specified in the flowchart. The computer program instructions may also be loaded onto a computer or other programmable apparatus to cause a series of operations to be performed on the computer or other programmable apparatus to produce a computer-implemented process such that the instructions, which execute on the computer or other programmable apparatus, provide operations for implementing the operations in the flowchart. The operations of the methods are described with help of apparatus 200. However, the operations of the methods can be described and/or practiced by using any other apparatus.

Without in any way limiting the scope, interpretation, or application of the claims appearing below, a technical effect of one or more of the example embodiments disclosed herein is to improve depth estimation of stereo images based on assigning each pixel to a disparity plane on receipt of a plurality of color segments and a primary depth map. Such depth estimation is capable of mitigating the effects of under-segmentation or over-segmentation while generation the plurality of color segments in the images, as the plane labels are assigned to each pixel in the images and the depth maps are generated based on the assigned plane labels to each pixel of the images. Various example embodiments are capable of extracting a dominant plane of a scene from a secondary depth map (a refined depth map that is sub-pixel accurate) which can be used in gaming and virtual reality based applications. Further, various example embodiments are capable of filling up holes in the secondary depth map which were formed due to occlusion pixels. Various example embodiments are capable of providing accurate disparity as the secondary depth map is based on plane fitting of the pixels and does not depend on perfect segmentation. It should be noted that various example embodiments are implemented without any need of additional hardware components.

Various embodiments described above may be implemented in software, hardware, application logic or a combination of software, hardware and application logic. The software, application logic and/or hardware may reside on at least one memory, at least one processor, an apparatus or, a computer program product. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of an apparatus described and depicted in FIGS. 1 and/or 2. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the embodiments are set out in the independent claims, other aspects comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present disclosure as defined in the appended claims.

What is claimed is:

1. A method comprising:
   facilitating receipt of a primary depth map and a plurality of color segments, the primary depth map being associated with a first image and a second image of a scene, the first image and the second image being a stereoscopic pair of images of the scene, and the plurality of color segments being associated with the first image;
   generating, by a processor, a plurality of disparity planes for the scene based on the plurality of color segments and the primary depth map, the plurality of disparity planes associated with a plurality of plane labels;
   determining, by the processor, an aggregated cost volume between pixels of the first image and pixels of the second image for the plurality of disparity planes;
   assigning, by the processor, plane labels to pixels of at least one image of the first image and the second image based on the aggregated cost volume, wherein an individual pixel of the pixels is assigned a plane label of the plane labels;
   generating, by the processor, a secondary depth map based on the plane labels assigned to the pixels of the at least one image, wherein generating the secondary depth map comprises refining the secondary depth map by assigning plane labels to one or more occlusion pixels based on plane labels of neighboring pixels of the one or more occlusion pixels; and
   determining, by the processor, a dominant disparity plane from the secondary depth map.

2. The method as claimed in claim 1, wherein facilitating receipt of the primary depth map and the plurality of color segments comprises:
   facilitating receipt of the first image and the second image of the scene;
   determining a primary cost volume between pixels of the first image and pixels of the second image for a plurality of disparity values, wherein the primary cost volume comprises a plurality of matching costs for each pixel of the first image and the second image;
   determining the plurality of color segments associated with the first image;
   determining a first depth map based on determining a least matching cost of the plurality of matching costs for the each pixel of the first image;
   determining a second depth map based on determining a least matching cost of the plurality of matching costs for the each pixel of the second image; and
   comparing the first depth map to the second depth map to generate the primary depth map and a first set of occlusion pixels between the first image and the second image.

3. The method as claimed in claim 1, wherein facilitating receipt of the primary depth map and the plurality of color segments comprises:
   facilitating receipt of the first image and the second image of the scene;
   determining a primary cost volume between pixels of the first image and pixels of the second image for a plurality of disparity values, wherein the primary cost volume comprises a plurality of matching costs for each pixel of the first image and the second image;
   determining the plurality of color segments for the first image, and determining a first segment tree for the first image and a second segment tree for the second image;
   aggregating the primary cost volume based on the first segment tree to generate a first aggregated cost volume for the first image and aggregating the primary cost volume based on the second segment tree to generate a second aggregated cost volume for the second image;
   determining a first depth map based on determining a least matching cost for each pixel of the first image from the first aggregated cost volume;
   determining a second depth map based on determining a least matching cost for each pixel of the second image from the second aggregated cost volume; and
   comparing the first depth map to the second depth map to generate the primary depth map and a first set of occlusion pixels between the first image and the second image.

4. The method as claimed in claim 1, wherein determining the aggregated cost volume comprises:
   computing a cost volume between the pixels of the first image and the pixels of the second image for the plurality of disparity planes; and
   performing a tree based aggregation method for aggregating the cost volume to generate the aggregated cost volume of the at least one image of the first image and the second image.

5. The method as claimed in claim 1, wherein assigning the plane labels to the pixels of the at least one image comprises:
   determining least label matching costs for the pixels of the at least one image from the aggregated cost volume based on a segment tree of the at least one image of the first image and the second image, wherein the aggregated cost volume comprises a plurality of label matching costs associated with the plurality of plane labels, the plurality of label matching costs computed for each pixel of the at least one image; and selecting the plane labels associated with the least label matching costs for assigning the plane labels to the pixels.

6. The method as claimed in claim 5, further comprising:
generating a third depth map for the first image based on the plane labels for the pixels of the first image;
generating a fourth depth map for the second image based on the plane labels for the pixels of the second image; and
comparing the third depth map to the fourth depth map to generate the secondary depth map and a second set of occlusion pixels between the first image and the second image.

7. The method as claimed in claim 1, further comprising:
obtaining initial pixel disparity through local matching analysis, computing initial plane parameters from each color segment, and refining plane parameters through fitting to grouped color segments.

8. An apparatus comprising:
at least one processor; and
at least one memory comprising computer program code, the at least one memory and the computer program code configured to, with the at least one processor, cause the apparatus to at least perform:
facilitate receipt of a primary depth map and a plurality of color segments, the primary depth map being associated with a first image and a second image of a scene, the first image and the second image being a stereoscopic pair of images of the scene, and the plurality of color segments being associated with the first image;
generate a plurality of disparity planes for the scene based on the plurality of color segments and the primary depth map, the plurality of disparity planes associated with a plurality of plane labels;
determine an aggregated cost volume between pixels of the first image and pixels of the second image for the plurality of disparity planes;
assign plane labels to pixels of at least one image of the first image and the second image based on the aggregated cost volume, wherein an individual pixel of the pixels is assigned a plane label of the plane labels;
generate a secondary depth map based on the plane labels assigned to the pixels of the at least one image, wherein the apparatus is caused to generate the secondary depth map by refining the secondary depth map by assigning plane labels to one or more occlusion pixels based on plane labels of neighboring pixels of the one or more occlusion pixels; and
determine a dominant disparity plane from the secondary depth map.

9. The apparatus as claimed in claim 8, wherein for facilitating receipt of the primary depth map and the plurality of color segments, the apparatus is further caused, at least in part to:
facilitate receipt of the first image and the second image of the scene;
determine a primary cost volume between pixels of the first image and pixels of the second image for a plurality of disparity values, wherein the primary cost volume comprises a plurality of matching costs for each pixel of the first image and the second image;
determine the plurality of color segments associated with the first image;
determine a first depth map based on determining a least matching cost of the plurality of matching costs for the each pixel of the first image;
determine a second depth map based on determining a least matching cost of the plurality of matching costs for the each pixel of the second image; and
compare the first depth map to the second depth map to generate the primary depth map and a first set of occlusion pixels between the first image and the second image.

10. The apparatus as claimed in claim 8, wherein for facilitating receipt of the primary depth map and the plurality of color segments, the apparatus is further caused, at least in part to:
facilitate receipt of the first image and the second image of the scene;
determine a primary cost volume between pixels of the first image and pixels of the second image for a plurality of disparity values, wherein the primary cost volume comprises a plurality of matching costs for each pixel of the first image and the second image;
determine the plurality of color segments for the first image, and determining a first segment tree for the first image and a second segment tree for the second image;
aggregate the primary cost volume based on the first segment tree to generate a first aggregated cost volume for the first image and aggregating the primary cost volume based on the second segment tree to generate a second aggregated cost volume for the second image;
determine a first depth map based on determining a least matching cost for each pixel of the first image from the first aggregated cost volume;
determine a second depth map based on determining a least matching cost for each pixel of the second image from the second aggregated cost volume; and
compare the first depth map to the second depth map to generate the primary depth map and a first set of occlusion pixels between the first image and the second image.

11. The apparatus as claimed in claim 8, wherein for determining the aggregated cost volume, the apparatus is further caused, at least in part to:
compute a cost volume between the pixels of the first image and the pixels of the second image for the plurality of disparity planes; and
perform a tree based aggregation method for aggregating the cost volume to generate the aggregated cost volume of the at least one image of the first image and the second image.

12. The apparatus as claimed in claim 8, wherein for assigning the plane labels to the pixels of the at least one image, the apparatus is further caused, at least in part to:
determine least label matching costs for the pixels of the at least one image from the aggregated cost volume based on a segment tree of the at least one image of the first image and the second image, wherein the aggregated cost volume comprises a plurality of label matching costs associated with the plurality of plane labels, the plurality of label matching costs computed for each pixel of the at least one image; and
select the plane labels associated with the least label matching costs for assigning the plane labels to the pixels.

13. The apparatus as claimed in claim 12, wherein the apparatus is further caused, at least in part to:
generate a third depth map for the first image based on the plane labels for the pixels of the first image;
generate a fourth depth map for the second image based on the plane labels for the pixels of the second image; and
compare the third depth map to the fourth depth map to generate the secondary depth map and a second set of occlusion pixels between the first image and the second image.

14. The apparatus as claimed in claim 8, wherein the apparatus is further caused, at least in part to obtain initial pixel disparity through local matching analysis, compute initial plane parameters from each color segment, and refine plane parameters through fitting to grouped color segments.

15. A computer program product comprising at least one non-transitory computer-readable storage medium, the at least one non-transitory computer-readable storage medium comprising a set of instructions, which, when executed by one or more processors, cause an apparatus to at least perform:
facilitate receipt of a primary depth map and a plurality of color segments, the primary depth map being associated with a first image and a second image of a scene, the first image and the second image being a stereoscopic pair of images of the scene, and the plurality of color segments being associated with the first image;
generate a plurality of disparity planes for the scene based on the plurality of color segments and the primary depth map, the plurality of disparity planes associated with a plurality of plane labels;
determine an aggregated cost volume between pixels of the first image and pixels of the second image for the plurality of disparity planes;
assign plane labels to pixels of at least one image of the first image and the second image based on the aggregated cost volume, wherein an individual pixel of the pixels is assigned a plane label of the plane labels;
generate a secondary depth map based on the plane labels assigned to the pixels of the at least one image, wherein the apparatus is caused to generate the secondary depth map by refining the secondary depth map by assigning plane labels to one or more occlusion pixels based on plane labels of neighboring pixels of the one or more occlusion pixels, and
determine a dominant disparity plane from the secondary depth map.

16. The computer program product as claimed in claim 15, wherein for facilitating receipt of the primary depth map and the plurality of color segments, the apparatus is further caused, at least in part to:
facilitate receipt of the first image and the second image of the scene;
determine a primary cost volume between pixels of the first image and pixels of the second image for a plurality of disparity values, wherein the primary cost volume comprises a plurality of matching costs for each pixel of the first image and the second image;
determine the plurality of color segments associated with the first image;
determine a first depth map based on determining a least matching cost of the plurality of matching costs for the each pixel of the first image;
determine a second depth map based on determining a least matching cost of the plurality of matching costs for the each pixel of the second image; and
compare the first depth map to the second depth map to generate the primary depth map and a first set of occlusion pixels between the first image and the second image.

17. The computer program product as claimed in claim 15, wherein for facilitating receipt of the primary depth map and the plurality of color segments, the apparatus is further caused, at least in part to:
facilitate receipt of the first image and the second image of the scene;
determine a primary cost volume between pixels of the first image and pixels of the second image for a plurality of disparity values, wherein the primary cost volume comprises a plurality of matching costs for each pixel of the first image and the second image;
determine the plurality of color segments for the first image, and determine a first segment tree for the first image and a second segment tree for the second image;
aggregate the primary cost volume based on the first segment tree to generate a first aggregated cost volume for the first image and aggregating the primary cost volume based on the second segment tree to generate a second aggregated cost volume for the second image;
determine a first depth map based on determining a least matching cost for each pixel of the first image from the first aggregated cost volume;
determine a second depth map based on determining a least matching cost for each pixel of the second image from the second aggregated cost volume; and
compare the first depth map to the second depth map to generate the primary depth map and a first set of occlusion pixels between the first image and the second image.

18. The computer program product as claimed in claim 15, wherein for determining the aggregated cost volume, the apparatus is further caused, at least in part to:
compute a cost volume between the pixels of the first image and the pixels of the second image for the plurality of disparity planes; and
perform a tree based aggregation method for aggregating the cost volume to generate the aggregated cost volume of the at least one image of the first image and the second image.

19. The computer program product as claimed in claim 15, wherein for assigning the plane labels to the pixels of the at least one image, the apparatus is further caused, at least in part to:
determine least label matching costs for the pixels of the at least one image from the aggregated cost volume based on a segment tree of the at least one image of the first image and the second image, wherein the aggregated cost volume comprises a plurality of label matching costs associated with the plurality of plane labels, the plurality of label matching costs computed for each pixel of the at least one image; and
select the plane labels associated with the least label matching costs for assigning the plane labels to the pixels.

20. The computer program product as claimed in claim 19, wherein the apparatus is further caused, at least in part to:
generate a third depth map for the first image based on the plane labels for the pixels of the first image;
generate a fourth depth map for the second image based on the plane labels for the pixels of the second image; and compare the third depth map to the fourth depth map to generate the secondary depth map and a second set of occlusion pixels between the first image and the second image.

21. The computer program product as claimed in claim 15, wherein the apparatus is further caused, at least in part to:
obtain initial pixel disparity through local matching analysis, compute initial plane parameters from each color segment, and refine plane parameters through fitting to grouped color segments.

* * * * *

UNITED STATES PATENT AND TRADEMARK OFFICE
CERTIFICATE OF CORRECTION

PATENT NO.          : 9,542,750 B2
APPLICATION NO.     : 14/561002
DATED               : January 10, 2017
INVENTOR(S)         : Muninder et al.

Page 1 of 1

It is certified that error appears in the above-identified patent and that said Letters Patent is hereby corrected as shown below:

On the Title Page

Insert item:
--(30)   Foreign Application Priority Data
Dec. 18, 2013   (IN)   .......................5918/CHE/2013--.

Signed and Sealed this
Sixth Day of March, 2018

Andrei Iancu
*Director of the United States Patent and Trademark Office*